United States Patent

[11] 3,613,084

[72] Inventor William W. Armstrong
St. Laurent, Quebec, Canada
[21] Appl. No. 761,936
[22] Filed Sept. 24, 1968
[45] Patented Oct. 12, 1971
[73] Assignee Bell Telephone Laboratories, Incorporated
Murray Hill, Berkeley Heights, N.J.

[54] TRAINABLE DIGITAL APPARATUS
2 Claims, 4 Drawing Figs.

[52] U.S. Cl. .......... 340/172.5
[51] Int. Cl. .......... G06f 15/18
[50] Field of Search .......... 235/157; 340/172.5

[56] References Cited

UNITED STATES PATENTS

| | | | |
|---|---|---|---|
| 3,311,895 | 3/1967 | Clapper | 340/172.5 |
| 3,457,552 | 7/1969 | Asendorf | 340/172.5 |
| 3,460,096 | 8/1969 | Barron | 340/172.5 |
| 3,484,749 | 12/1969 | Andreae et al. | 340/172.5 |
| 3,262,101 | 7/1966 | Halpern | 340/172.5 |
| 3,327,291 | 6/1967 | Lee | 340/172.5 |
| 3,341,823 | 9/1967 | Connelly | 340/172.5 |

OTHER REFERENCES

Comeretto, Alan; Bionics Efforts Center on Learning Machines. In Electronic Design, Sept. 13, 1961; pp. 30– 33.

*Primary Examiner*—Gareth D. Shaw
*Assistant Examiner*—Melvin B. Chapnick
*Attorneys*—R. J. Guenther and Kenneth B. Hamlin

ABSTRACT: A plurality of all-digital elements are interconnected to form an $n$-input single-output network that can be structurally organized during a training or learning period to implement specified logical functions of $n$ variables. Actually, for up to about 10 input variables, any desired Boolean function may be implemented by training a single element. For larger numbers of input variables, a wide class of functions may be implemented by training a multielement network. During training (for an array that contains either a single element or a plurality of interconnected elements) the response of the array is monitored and compared with the desired response for each of a set of input signals. As a result of each comparison operation, identical binary training signals are simultaneously applied to every element of the array. These signals may cause the internal states of the element(s) to change. By systematically changing these individual states in accordance with prescribed training strategies, the overall array is ultimately configured to give correct responses to at least specified portion of subsequently-applied input signals.

INVENTOR
W. W. ARMSTRONG
BY Lucian C. Canepa
ATTORNEY

TRAINABLE DIGITAL APPARATUS

This invention relates to the selective processing of information signals and more particularly to a general-purpose all-digital apparatus that can be systematically trained to perform many different logical operations.

BACKGROUND OF THE INVENTION

Any desired Boolean function of $n$ input variables can be realized by constructing a special-purpose circuit adapted to implement the desired function. For systems in which many different functions must be implemented, the design and manufacturing costs of such individual special-purpose circuits can become very great. This is especially true for special-purpose logical circuits having relatively large numbers of inputs.

An alternative approach to the structural realization of various different logical functions is to design a general-purpose configuration and then train the configuration (by successive physical alterations of its internal states) to implement a particular desired function. An example of this approach is embodied in the self-synthesizing machines described in U.S. Pat. No. 3,327,291 to R. J. Lee, issued June 20, 1967, and U.S. Pat. No. 3,262,101 to P. S. Halpern issued July 19, 1966.

Self-synthesizing or learning machines of the type described in the Lee and Halpern patents are not all-digital in nature and are relatively complex in configuration even for small numbers of inputs. For large numbers of inputs (for example, for $n$ greater than 20) learning machines as heretofore proposed become almost hopelessly complex.

SUMMARY OF THE INVENTION

Accordingly, an object of the present invention is an improved general-purpose apparatus.

More specifically, an object of this invention is an all-digital general-purpose apparatus that can be systematically trained to implement a prescribed logical function.

Another object of the present invention is a self-organizing adaptive apparatus that includes only finite-state deterministic components.

Still another object of this invention is a general-purpose trainable apparatus characterized by reliability, simplicity and ease of fabrication.

These and other objects of the present invention are realized in a specific illustrative embodiment thereof that comprises in its most basic form one all-digital $m$-input single-output element. The element includes $2^m$ up-down counting units to which binary input signals are applied via $2^m$ input logic gates. The outputs of the input logic gates are also applied to a corresponding number of output logic gates whose partial enablement is determined by $2^m$ bistable units respectively controlled by the conditions of the counting units and by training signals.

For up to about 10 input variables any desired Boolean function may be implemented by training a single element. For larger numbers of input variables, a wide class of functions may be implemented by forming a network that comprises a plurality of elements interconnected in a loop-free manner in an $n$-input single-output array is structurally organized during a training or learning period to implement specified logical functions of $n$ variables.

During training (for an array that contains either a single element or a plurality of interconnected elements) the response of the array is monitored and compared with the desired response for each of a set of input signals. As a result of each comparison operation, identical binary training signals are simultaneously applied to every counting unit included in the array. These signals may cause the various exactly-determined internal states of the element(s) to change. By systematically changing these individual states in accordance with prescribed training strategies, the overall array is ultimately configured to give correct responses to at least a specified portion of subsequently-applied input signals.

It is accordingly a feature of the present invention that a learning apparatus comprise an all-digital $m$-input element having an exactly determined number of internal states which are selectively controlled by the application to the element of binary training signals.

It is another feature of this invention that each element include $2^m$ up-down counting units for controlling the respective conditions of $2^m$ associated bistable units capable of partially enabling a corresponding number of output logic gates, the element also including $2^m$ input logic gates responsive to applied input signals for applying partially enabling signals to the counting units and to the output logic gates.

It is still another feature of the present invention that a plurality of such elements be interconnected in a loop-free array to form an $n$-input single-output network capable of being trained in a systematic way.

DESCRIPTION OF THE DRAWING

A complete understanding of the present invention and of the above and other objects, features and advantages thereof may be gained from a consideration of the following detailed description of several specific illustrative embodiments thereof presented hereinbelow in connection with the accompanying drawing, in which.

DETAILED DESCRIPTION

Figure 1:
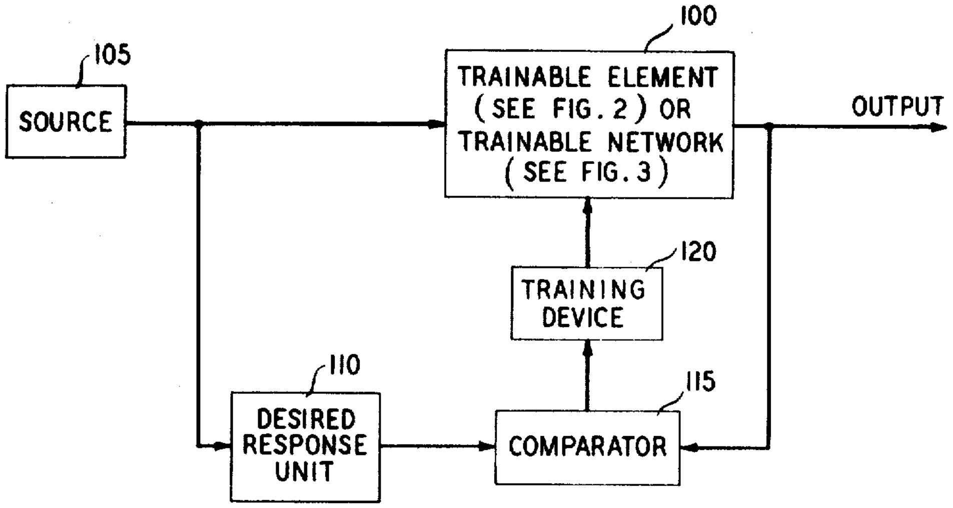
FIG. 1 is an overall block diagram of a system in which a specific illustrative embodiment of the principles of the present invention may be trained.

An example of a particular system suitable for training an element or network made in accordance with the principles of the present invention is shown in FIG. 1. The apparatus to be trained is represented by box 100. Binary input signals are applied to the trainable apparatus 100 from a source 105 which produces patterns of "0" and "1" signals. These signals are also applied to a so-called desired response unit 110 that may, for example, comprise a combinational logic network, a suitably programmed general-purpose computer or a human operator equipped with conventional signal detecting and generating apparatus. In response to each applied set of signals from the source 105 and in accordance with a prescribed input-output function, the unit 110 provides either a "0" or a "1" output signal. This output signal from the unit 110 is applied to a comparator 115 wherein the signal serves as a standard against which to compare the output of the apparatus 100. In turn, the comparator 115 applies a signal to a training device 120 (which may, for example, comprise a special-purpose computer or a human operator equipped with conventional signal detecting and generating apparatus) to indicate whether or not the outputs from the apparatus 100 and the unit 110 are identical. In response thereto and in accordance with various training strategies to be described in detail hereinbelow, the device 120 applies appropriate synchronously timed training signals to the apparatus 100. As a result of the training operation, the apparatus 100 is eventually structurally configured to respond to subsequently applied input signal patterns to respectively provide desired output signals.

Once trained, the apparatus 100 shown in FIG. 1 may be disassociated from the depicted training system. Thereafter the apparatus is available to be utilized in any information signal processing application requiring the particular logical function embodied in the trained structure.

Figure 2:
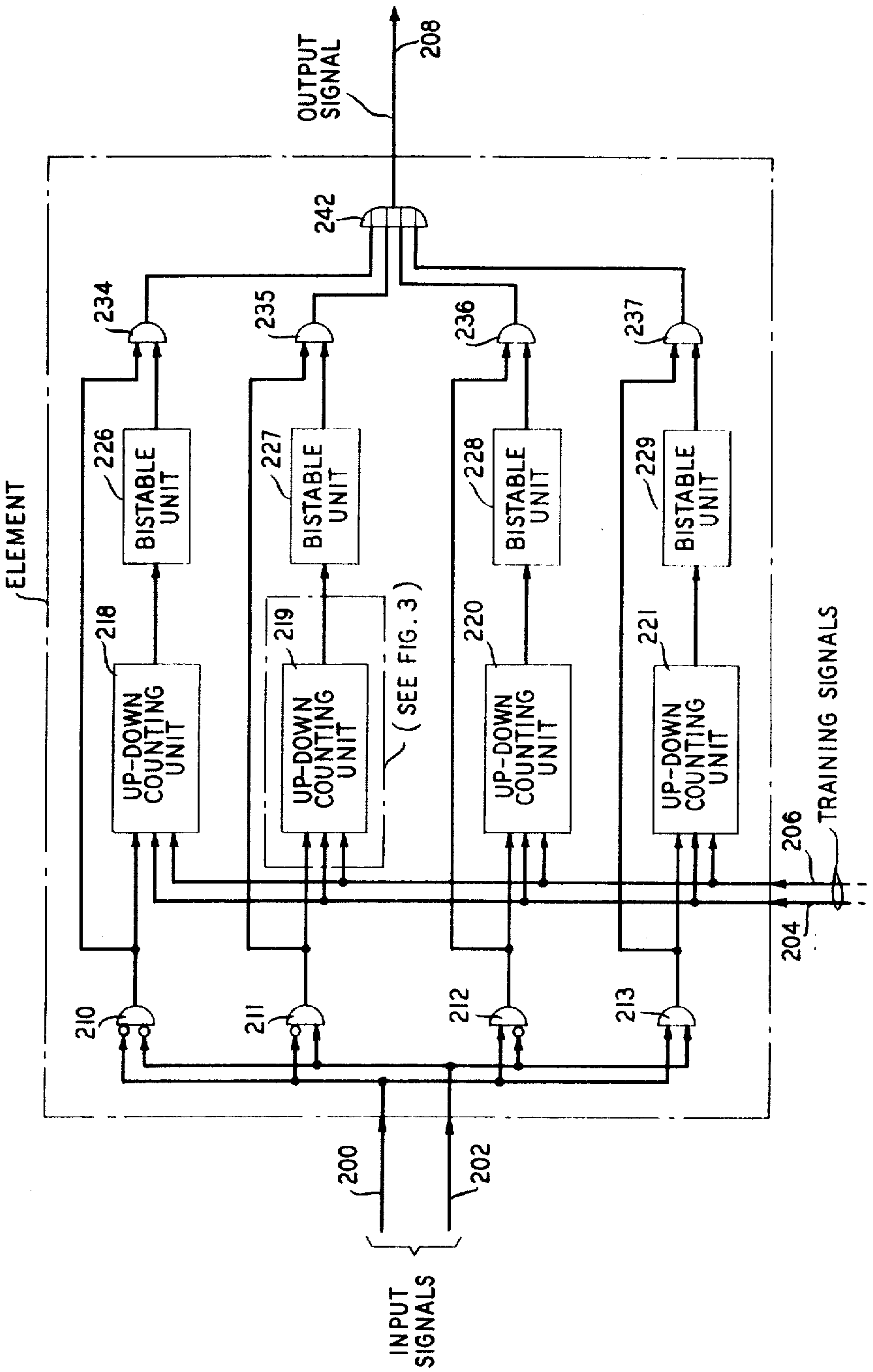
FIG. 2 depicts a trainable element made in accordance with this invention.

As mentioned above, the apparatus 100 of FIG. 1 may constitute either a single element or a network comprising a plurality of interconnected elements. A specific such element made in accordance with the principles of the present invention is shown in FIG. 2. For illustrative purposes the depicted element is shown as having two main input signal leads 200 and 202, two training signal leads 204 and 206 and a single output signal lead 208. More generally, an element of the type shown is adapted to have any practically feasible number of main input signal leads extending thereto. In all cases, however, the elements each include two training signal leads and a single output lead.

The particular element represented in FIG. 2 includes $2^m$ or four input logic gates 210 through 213, where *m* is the number of main input signal leads that extend to the element. These input gates comprise, for example, composite AND units preceded in some cases by inverters. Each such inverter is represented by a circle on the input side of its associated AND unit. Also included in the illustrative element are $2^m$ or four up-down counting units 218 through 221, $2^m$ or four bistable units 226 through 229, $2^m$ or four output AND logic gates 234 through 237 and an output OR logic gate 242.

As indicated in FIG. 2, input signals are applied directly to the aforementioned input gates 210 through 213 of the depicted element, training signals are applied via the leads 204 and 206 to every one of the counting units thereof and an output signal is obtained from the gate 242.

The structures of the composite inverter AND gates 210 through 213 are chosen such that a different one of those gates provides a unique output (for example, a "1" signal) in respective response to the application of the input leads 200 and 202 of the four different possible binary patterns 0,0, 0,1, 1,0 and 1,1. Thus, for instance, the pattern 1,1, which is applied in parallel to every one of the input gates 210 through 213, activates only the gate 213, due to the fact that at least one of these "1" input signals is inverted before being applied to the AND portions of the other gates 210 through 212. It is apparent, therefore, that the patterns 0,0, 0,1 and 1,0 (where the left-hand digit of each pair of input digits is assumed to be applied to the input lead 200) will activate only the input gates 210, 211 and 212, respectively.

As will be evident later in connection with the description of FIG. 3, the single input logic gate that is activated serves to partially enable a path between the counting unit to which the activated gate is connected and the training signal leads 204 and 206. As a result, subsequently applied training signals are routed only to that counting unit whose associated input logic gate is activated.

The single activated one of the input logic gates 210 through 213 of FIG. 2 also serves to partially enable a corresponding one of the output AND gates 234 through 237. The other input to each of the gates 234 through 237 is derived from an associated one of the bistable units 226 through 229 which in turn are respectively controlled by the counting units 218 through 221. (In one of its two stable states a bistable unit puts out a "0" signal and in the other state it puts out a "1" signal.) Only the states of the bistable units 226 through 229 and not the states of the counting units 218 through 221 in the element determine the output of the element at the presentation of a set of input signals.

The FIG. 2 element will be better understood by considering in detail the nature of one of the up-down counting units thereof. For this purpose a specific illustrative configuration suitable for implementing the counting unit 219 is shown in FIG. 3. The unit of FIG. 3 includes a conventional four-stage reversible counter 300 and an associated plurality of AND and inverter AND logic gates 305 through 311. As will be described in further detail below, the gates 305 through 311 serve to route input and training signals applied to the unit 219 to cause up-counting, down-counting or resetting of the counter 300. Each time that a resetting signal is applied to the counter 300 from the gate 309, an output signal appears on lead 315 of the unit depicted in FIG. 3. In turn, this output signal is effective to change the state of the associated bistable unit 227 shown in FIG. 2.

Figure 3:
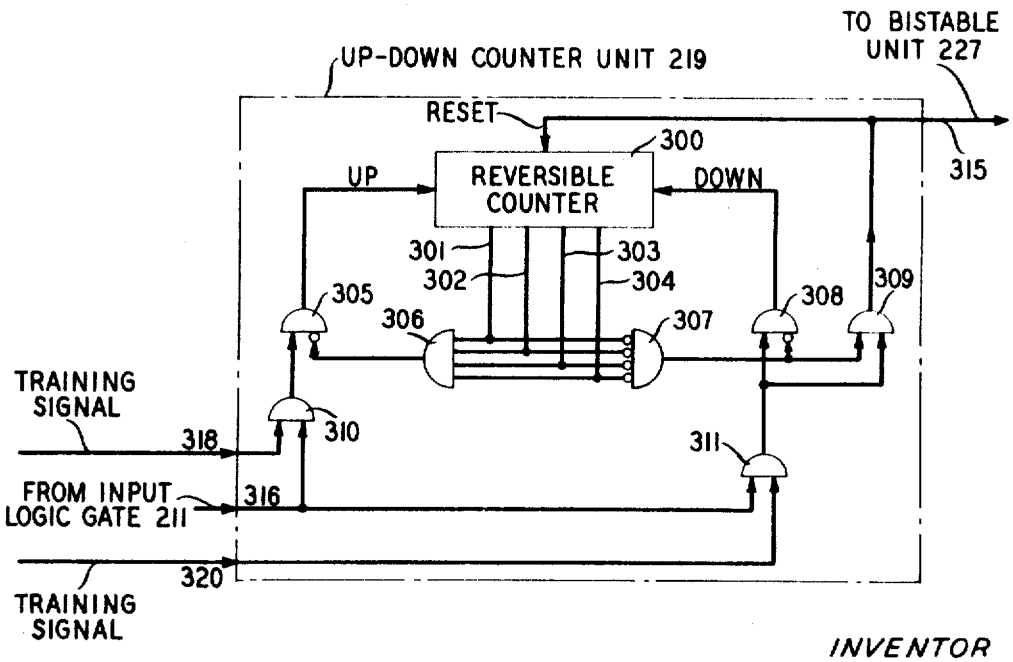
FIG. 3 is a more detailed depiction of one portion of the element shown in FIG. 2.

In the above specific illustrative embodiment of the principles of the present invention, the unit 219 of FIG. 3 includes a 16-state counter 300. For convenience, these states are designated herein as "0" through "15." In addition, it is assumed that the initial state of the counter 300 is "8" and furthermore than each "1" reset signal applied to the counter 300 from the gate 309 is effective to switch the state of the counter to the value of "8."

The counter 300 of FIG. 3 includes four output leads 301 through 304 which respectively emanate from the four stages of the counter. When the counter is in its "0" state, each of the output leads thereof has a "0" signal impressed thereon, whereas when the counter is in its "15" state each of the noted leads has a "15" signal thereon. For counter states in between "0" and "15" less than all of the leads 301 through 304 have "1" signals applied thereto. Thus, the AND gate 306 associated with the counter provides a "1" output signal only if the counter is in its "15" state and the inverter AND gate 307 provides a "1" output signal only if the counter is in its "0" state.

The operation of the FIG. 3 unit in response to various combinations of input and training signals will now be illustrated. If the input logic gate 211 (shown in FIG. 2) supplies a steady-state "0" signal to input lead 316 of the unit 219, neither one of the AND gates 310 and 311 of FIG. 3 is partially enabled. Under those conditions, any pulse-type training signals applied to input leads 318 and 320 of the unit are not routed to the counter 300. On the other hand, if a steady-state "1" signal is applied from the gate 211 to the unit 219, both of the AND gates 310 and 311 are partially enabled or primed to pass any subsequently applied training signals.

Assume that the gates 310 and 311 of FIG. 3 are primed by a "1" signal on lead 316 and that "1" and "0" training signals are respectively applied to the input leads 318 and 320. As a consequence, the gate 310 provides a "1" output signal and the gate 311 provides a "0" output signal. In addition, assume that the counter 300 is in its initial "8" state, whereby each of the gates 306 and 307 provides a "0" output signal. As indicated in FIG. 3 each of these "0" signals is in turn inverted before being applied to the AND portions of the gates 305 and 308. As a result, the gates 305 and 308 are thereby partially enabled. Hence, the "1" signal provided by the gate 310 is passed through the gate 305 and applied to the counter 300 as an up-counting signal therefor. Under these assumed conditions, neither one of the gates 308 and 309 provides a " 1" output signal whereby no down-counting or resetting signal is applied to the counter. Nor under the stated conditions is a "1" signal applied to the output lead 315 of the unit 219.

Accordingly, in response to the specified "1," "1" and "0" signals respectively applied to the input leads 316, 318 and 320 of the unit 219 shown in FIG. 3, the condition of the counter 300 is incremented by one to its "9" state. In response to six additional sets of input signals identical to the set of signals specified above, the counter 300 is further incremented in a step-by-step fashion to assume the state "15." At that point in the cycle of operation of the counter, the AND gate 306 is activated to provide a "1" output signal which serves to inhibit the gate 305 from supplying a further up-counting signal to the counter. Thus, additional up-counting sets of input signals applied to the leads 316, 318 and 320 are not effective to change the state of the counter 300.

With the counter 300 of FIG. 3 in its "15" state, assume that a so-called down-counting set of input signals is applied to the unit 219. Such a set comprises "1, " "0" and "1" signals respectively applied to the input leads 316, 318 and 320. In response thereto the AND gate 311 provides a "1" output signal which is passed through the gate 308 (but not through the gate 309). This "1" signal causes the counter 300 to be decremented by one to a count of "14" In response to 14 additional such input sets of down-counting signals, the counter can be driven to its "0" state. At that point the gate 307 is activated to provide a "1" signal which inhibits the gate 308 from supplying a subsequently -applied down-counting signal to the counter 300. In addition, this same "1" signal partially enables the gate 309. As a result, a subsequently applied set of down-counting signals causes a "1" signal to be routed via the gates 311 and 309 to reset the counter to its initial "8" state. Also, the "1" output of the gate 309 is applied via lead 315 to change the state of the associated bistable unit 227 (which, for example, comprises a conventional complementary flip-flop).

With the operation of the unit 219 of FIG. 3 in mind, it is now a relatively straightforward matter to describe the mode of operation of the unique illustrative element depicted in FIG. 2. As an initial matter, assume that the counting units 218 through 221 thereof are each set to their "8" states and that the bistable units 226 through 229 are each set to provide "0" output signals. Assume further that the illustrative element is to be trained to provide a "1" output signal on the lead 208 in response to the respective application of the input leads 200 and 202 of signals representative of 0,0 or 1,1. For each of the other two possible input signal combinations (namely, 1,0 or 0, 1) the element is to provide a "0" output signal. In other terms, the desired response function is $f(0,0)=1$, $f(0,1)=0$, $f(1,0a)=0$ and $f(1,1)=1$.

During the training or learning period of the FIG. 2 element, assume for illustrative purposes that 16 0,0 input signals are respectively applied in sequence to the leads 200 and 202, followed by sixteen 0,1 pairs, 16 1,0 pairs and finally 16 1,1 pairs. Advantageously, each one of the applied input signals is steady-state in nature, persisting for a substantial portion of each successive synchronously timed clock period.

The first pair of 0,0 input signals causes only the input logic gate 210 of FIG. 2 to provide a "1" output signal. This "1" signal is applied to the output logic gate 234 which also has a "0" signal applied thereto from its associated bistable unit 226. Consequently, the gate 234 supplies a "0" signal to the OR gate 242. And since no other one of the gates 234 through 237 supplies a "1" signal to the gate 242 in response to the assumed 0,0 input signals, the signal appearing on the output lead 208 is a "0" signal. This "0" output signal is compared in the unit 115 (FIG. 1) with the desired response (a "1" signal). As a result of this comparison operation the training device 120 (FIG. 1) is signaled that the response of the FIG. 2 element is incorrect.

The training device 120 is, for example, adapted to respectively apply "1" and "0" training signals to the leads 204 and 206 of FIG. 2 if the element responds in the desired manner to the specified input signals. Advantageously, these training signals are pulse-type in nature and occur briefly only once during the application of the previously mentioned synchronously timed input signals. Such a set of training signals serves to reward the depicted element by causing up-counting of the particular counting unit thereof whose associated input logic gate is providing a "1" signal. On the other hand, if the element responds to its input signals in other than the desired manner, the training device is adapted to respectively apply "0" and "1" signals to the leads 204 and 206. Such a set of training signals serves to punish the behavior of the depicted element by causing down-counting of the counting unit whose associated input logic gate is providing a "1" signal.

Accordingly, for the particular training sequence specified above, the device 120 supplies a down-counting set of training signals to the leads 204 and 206 of FIG. 2 to indicate to the element that the first applied set of 0,0 input signals has not elicited the correct response (a "1" signal) from the element. As a result of this first set of training signals, the count of the unit 218 is decremented by one to the "7" state. However, the conditions of the other counting units 219 through 221 and of the bistable units 226 through 229 are not thereby changed.

Seven additional pairs of 0,0 input signals are then applied in sequence to the input leads 200 and 202 of FIG. 2. The output appearing on the lead 208 in respective response to each such input pair is not the desired one. Hence, seven additional down-counting training signals are successively routed to the counting unit 218. As a result, the count thereof is successively decremented to the values "7," "6," "5," "4," "3," "2," "1" and "0," respectively. In response to the next or ninth pair of 0,0 input signals, the element provides another incorrect response and, as a consequence, another set of down-counting training signals is applied thereto. In response to these training signals and in accordance with the mode of operation described above in connection with FIG. 3, the counting unit 218 is reset to its "8" state. In addition, the unit 218 applies a "1" signal to the associated bistable unit 226 to switch the unit 226 to its "1" state thereby to partially enable the gate 234 to pass the "1" signal output of the gate 210 to the gate 242 and to the output lead 208. Hence, during the next synchronously timed clock period, the application to the element of the next or 10th pair of 0,0 input signals will cause the training device to apply reward pulses (that is "1" and "0" signals to the training leads 204 and 206, respectively) to indicate that the element has provided the desired response to the most recently applied set of 0,0 input signals. In response to these training signals, the unit 218 is incremented to its "9" state.

The next six successively applied pairs of 0,0 input signals each cause the FIG. 2 element to provide a "1" output signal, which is the desired response [$f(0,0)=1$] of the element. Hence, in respective response to these six input pairs, six successive sets of up-counting training signals are applied to the depicted element by the aforementioned training device 120 whereby the counting unit 218 included in the element is successively driven to the states "10" through "15." Accordingly, after application to the element of the first 16 input pairs (0,0) signals the up-down counting unit 218 is in its "15" state, the bistable unit 226 is in its "1" state and each of the units 219 through 221 and 227 through 229 is still in its initial state. During subsequent training of the element, the units 218 and 226 remain in their respective noted states, due to the fact that the input gate 210 will never again provide a "1" enabling signal to the gates 310 and 311 (FIG. 3) included in the counting unit 218 of FIG. 2.

Next, 16 0,1 input signal pairs are applied to the illustrative element shown in FIG. 2. each such input pair comprises a "0" signal applied to the lead 200 and a "1" signal simultaneously applied to the lead 202, which causes only the input gate 211 of the gates 210 through 213 to provide a "1" signal. The desired response to each such input pair is a "0" output signal [$f(0,1)=0$] appearing on the lead 208. Although the output gate 234 is partially enabled by the previously described "1" signal applied thereto from the bistable unit 226, and although the output gate 235 is partially enabled by the aforementioned "1" signal from the input gate 211, none of the output gates 234 through 237 is fully enabled to supply a "1" signal to the gate 242. Hence, the element provides the desired output (a "0" signal on the lead 208) in response to the application thereto of the first 0,1 input pair. As a result, the count of the unit 219 is incremented to "9." In an identical fashion the next six input signal pairs are effective to drive the unit 219 to the states "10," "11" "12," "13," "14" and "15," respectively. Each of the next nine input pairs also causes the element to provide the desired "0" signal response. However, in view of the mode of operation described above in connection with FIG. 3, the counting unit 219 remains in its "15" state during the application to the element of these last-mentioned input pairs. At no time in its cycle of operation is the unit 219 reset. Therefore the associated bistable unit 227 is never switched from its initial "0" condition.

In view of the description above, it is apparent that subsequently applied sets of 16 1,0 input signal pairs and 16 1,1 pairs are effective to also drive each of the counting units 220 and 221 to its "15" state. Moreover, during this portion of the training cycle the bistable unit 228 remains in its initial "0" condition but the bistable unit 229 is switched to its "1" condition.

Accordingly, at the completion of the above-described training of the element shown in FIG. 2, the counting units 218 through 221 are each in their "15" states and the bistable units 226 through 229 are respectively representative of the conditions "1," "0," "0" and "1." At that point the illustrative element has been structurally configured to implement the specified functions $f(0,0)=1$, $f(0,1)=0$, $f(1,0)=0$ and $f(1,1)=1$.

A study of the above-specified training procedure for the FIG. 2 element reveals that the order in which the noted four sets of 16 input signal pairs are applied to the element is immaterial to the desired final result. Furthermore, it has been determined that this result can be achieved with a random input sequence.

Actually, for the case of a single $m$-input element of the type shown in FIG. 2, the specified counting units are not necessary unless the input-output function is somehow corrupted by noise. In a noise-free environment the counting units may be omitted and the applied training signals routed directly to the bistable units to control the conditions thereof.

It is feasible to build elements of the type shown in FIG. 2 with up to about 10 input leads. A 10-input element includes $2^{10}$ or 1,024 input logic gates, 1,024 counting units, 1,024 bistable units and 1,024 output logic gates. For much larger numbers of inputs, however, it may not be practicable simply to continue to build a more and more complex individual element. For example, for 100 inputs one would need an element have $2^{100}$ (about $10^{30}$) individual circuits, which is probably as a practical matter not attainable. (There are roughly only $10^{19}$ molecules per cubic centimeter of a gas at standard temperature and pressure.)

In accordance with the principles of the present invention, a plurality of $m$-input individual elements of the type described above are interconnected in a selective manner to provide an $n$-input single-output network. In this way, large numbers of inputs can be accommodated without the necessity of building unduly complex individual elements. Networks made in this fashion can be trained to implement a large class of logical functions.

Figure 4:
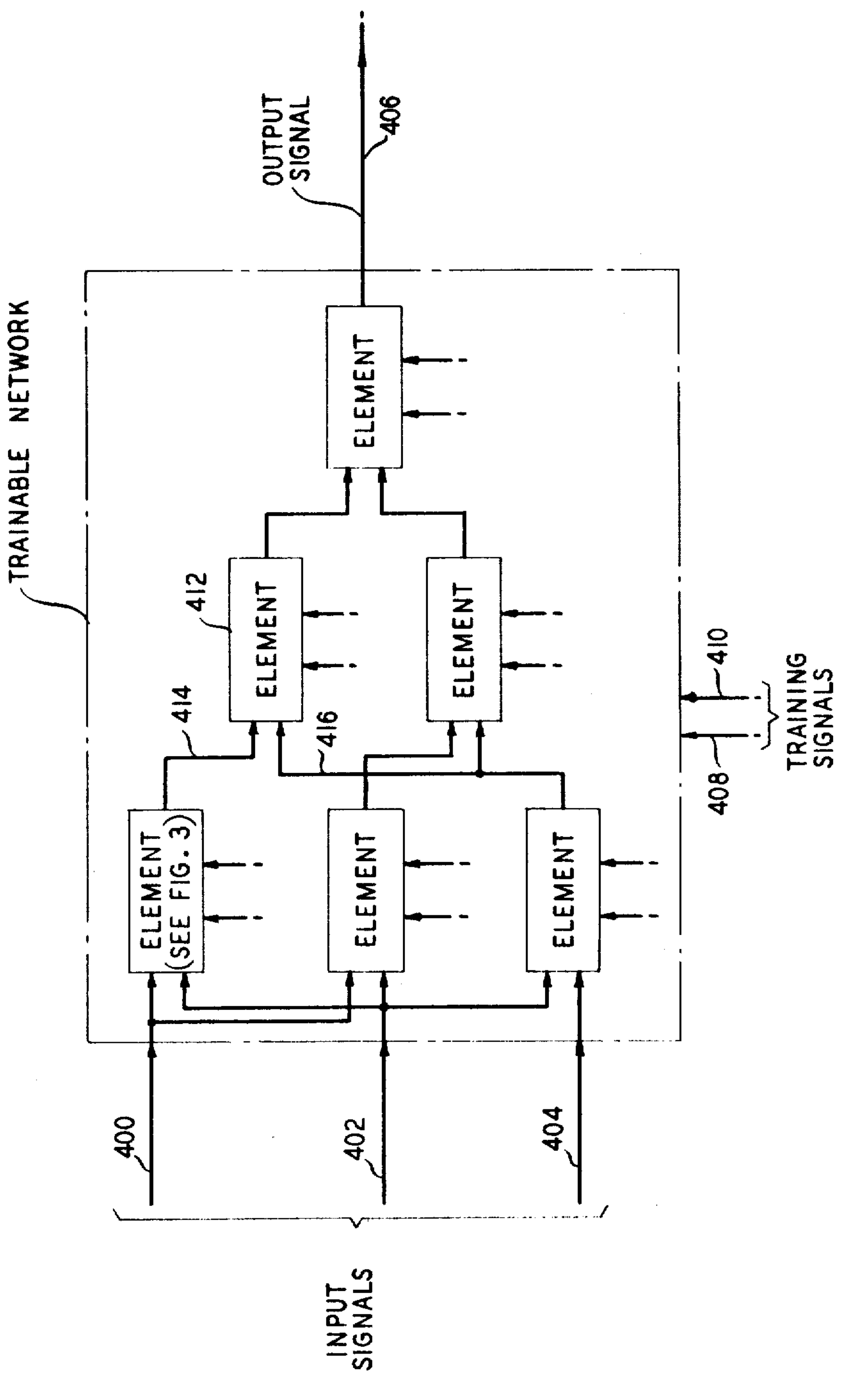
FIG. 4 shows a particular illustrative trainable network that embodies the principles of the present invention.

FIG. 4 depicts a specific illustrative network made in accordance with this invention. For purposes of simplicity, the network is shown as having only three inputs. Thus, it is apparent that as a practical matter a single three-input element could replace the entire FIG. 4 network. However, the illustrative network does serve to show in a simple way the manner in which individual elements can be connected together to form a multi-input network. By way of example, each element included in the FIG. 4 network is assumed to be of the two-input type shown in FIG. 2.

In accordance with the principles of this invention, a network is formed by interconnecting the constituent elements thereof in a so-called loop-free configuration. (By a loop is meant a subset of elements $E_1, E_2, ..., E_n$ such that the output of $E_1$ serves as an input to $E_2$, the output of $E_2$ serves as an input to $E_3$, ..., the output of $E_{n-1}$ serves as an input to $E_n$, and finally such that the output of $E_n$ serves as an input to $E_1$. A loop-free configuration is a connection pattern of elements in which no subset of elements constitutes a loop.) Any loop-free interconnection will work. The specified one shown in FIG. 4 is illustrative only.

A network of the type shown in FIG. 4 can be trained (that is, structurally configured to implement a desired logic function) by including it in a system such as that illustrated in FIG. 1. The training procedure involves comparing the output of the network with that of the previously described desired response unit 110. However, the subsequent action of the training device 120 in response to signals from the comparator 115 is different than that specified above in connection with the training of an individual element. In particular, the device 120 is adapted to apply signals to the network being trained in accordance with either of the two training strategies detailed below, or even a combination of the two as described later.

For each of the strategies to be described below the source 105 of FIG. 1 is assumed to provide a 3-digit input pattern (out of a set I of possible patterns) during each of a plurality of successive clock periods. Further, it is assumed that each pattern is chosen independently according to a probability measure $p$ on I; that is, the probability that the pattern provided by the source belongs to a subset A of I is $p$ (A). The desired response function of the illustrative network shown in FIG. 4 is defined on I and has "0" and "1" as possible output values.

In accordance with the first strategy or training procedure that embodies the principles of the present invention, and before training is actually begun on a certain logical task, the desired quality of the final (trained) network is chosen. For example, one could specify that the final state of the illustrative network shown in FIG. 4 be such that the probability of the set of patterns to which the network gives a correct response when in that state will be at least 0.99. In order to monitor the progress toward this goal during training, the sequence of patterns presented during training is broken up by the device 120 (FIG. 1) into a succession of blocks, with each block consisting of, say, 100 patterns. For each such block the device 120 evaluates the total number of wrong responses, the total number of right responses and determines the value of a quantity Q which is exactly or approximately equal to the ratio of the number of wrong responses divided by the number of right responses, provided that the number of right responses is at least 50. If fewer than 50 input patterns are responded to correctly, Q is set equal to 1.

During training, signals representative of the digits of each 3-digit input word are respectively applied to leads, 400, 402 and 404 of the network depicted in FIG. 4. In response thereto, the network functions as a combinational logic circuit and produces a "0" or a "1" output signal on lead 406. In turn, this output signal is compared (in the FIG. 1 training system) with the desired response of the network. If the output response of the network is not the desired one, the training device 120 applies a down-counting pair of training signals to training leads 408 and 410, which signals are applied to every one of the elements shown in FIG. 4. If, on the other hand, the response of the network being trained is the one desired, the training device 120 chooses randomly between two actions: with probability Q (determined from the previous block of 100 patterns) the device 120 applied up-counting signals to the training leads 408 and 410; or with probability 1–Q the device applies a "0" signal to each of the leads 408 and 410. In the latter case neither up-counting nor down-counting can occur. In other words, no change in the up-down counting units and bistable units included in the network is produced in response to such a 0,0 or neutral pair of training signals.

In accordance with the invention, the value of Q is chosen initially to be 1, but as the performance of the illustrative network improves to the point that the ratio of the number wrong to the number right becomes less than unity, Q is successively altered, with a general tendency for reduction. This reduction in the value of Q is significant in that it leads to a reduced proportion of rewards (up-counting training signals) and thereby tends to stimulate change in the bistable units of the network. If Q were maintained at 1, that is, if all input patterns resulted in either reward or punishment, then when the probability of a correct network response had become close to 1, the counting units of the network would on the whole tend to be driven to their maximum values whereby further changes of the constituent bistable units would be strongly inhibited and learning thereby slowed almost to a standstill.

More specifically, in accordance with the first training procedure embodying the principles of the present invention, Q is successively altered in the following illustrative manner. Suppose in a particular training sequence that of the first block of 100 patterns, 37 lead to the correct network response. Accordingly the ratio of wrong to right responses is 63/37. Since this is larger than unity, the training device 120 sets Q equal to 1 for the second block, which implies that for this block, as was the case for the first block, all 100 patterns lead to either an up-count or a down-count. In the second block the ratio of wrongs to rights is, say 40/60,≅0.66. The training device 120 might then, by the procedure of rounding off this fraction, set $Q=0.7$ for the third block. For the third block the above ratio becomes, say, 25/75,≅0.33, where all of the 25 incorrectly processed patterns caused down-counts and 55 of the 75 correctly processed patterns led to up-counts. This is consistent with what one would expect since $75Q=52.5$. The above ratio leads to the choice of $Q=0.3$ for the fourth block. During the fourth block the ratio of wrongs to rights becomes, say $20/80,=0.25$, and there were 20 down-counts and 25 up-counts. Since the above ratio has changed more slowly, the numbers of up-counts and down-counts have come closer to equality which is desirable. For the fifth block, the training device 120 chooses $Q=0.3$ again, and the result is a ratio of $30/70,\cong0.43$, with 30 down-counts and 24 up-counts. For the sixth block $Q=0.4$. The fact that performance may deteriorate and $Q$ may have to be increased is a phenomenon which is to be expected with this type of device. Experience has shown that such setbacks are usually of short duration and that if there exist configurations of the bistable devices leading to correct responses to all input patterns, then this strategy or the other one described below will ultimately lead to such a configuration.

The reason for choosing the above training strategy will become apparent when the influence of the strategy on the sequence of values of a particular counting unit of a particular element in the FIG. 4 network is analyzed. Consider, for example, the element 412 of FIG. 4. Let $I_{00}$ be the set of all symbols in I which lead to a 0,0 input pair to the chosen network element. Define similarly $I_{01}$, $I_{10}$, $I_{11}$. Let $I_R$ be the set of all symbols of I to which the illustrative network gives the right response, and let $I_W$ be the set of all symbols of I to which the network gives the wrong response. These subsets of I will, of course, vary as the bistable units of the depicted network change state. However, the present analysis is concerned only with the tendency towards change or fixity of the state of a certain bistable unit for a succession of clock cycles during which none of the bistable units changes state.

In each clock cycle, that is, for each three-digit symbol produced by the source 105 of FIG. 1, the probability of a down-counting pair of training signals being applied to the FIG. 4 network is $p(I_W)$; the probability of an up-counting pair of training signals is $Qp(I_R)$; and the probability of a so-called neutral pair of training signals is $1-p(I_W)-Qp(I_R)$. Hence the counting units of the network will tend to count up, leading to fixity of the states of the bistable units thereof if $Qp(I_R)-p(I_W)>0$, that is, if $Q>p(I_W)/p(I_R)$. According to the method for choosing Q, this implies that the network should have a slight tendency towards fixity. This does not mean that all counting units tend towards fixity, however. Consider, for example the counting unit C00 of the element 412. (The designation C00 is intended to refer to that one of the up-down counting units of the element 412 which receives a "1" signal from its associated input logic gate in response to a 0,0 pair of input signals applied to the input leads 414 and 416. Similarly, the designation B00 will be utilized below to refer to the bistable unit associated with C00.). The probability that it will count down is $p(I_W\cap I_{00})$, and the probability that it will count up is $Qp(I_R\cap I_{00})$. It will tend to count up if $Qp(I_R\cap I_{00})-p(I_W\cap I_{00})>0$, and its tendency to count up can be measured by the value of the left member of this inequality. On the other hand, C00 will tend to count down and B00 will tend to change if $Qp(I_R\cap I_{00})-p(I_W\cap I_{00})<0$. If all counting units were reset after any bistable unit changed state, then the bistable unit which would change next would likely be the one whose associated counting unit has the most negative tendency to count up of all counting units. The added refinement of resetting counting units after any bistable unit changes is not necessary in general, although it might prove advantageous in some applications.

The tendency of B00 towards fixity or change can be related heuristically to how well or poorly the element 412 of FIG. 4 is performing under input 0, 0, as follows: the quotient $Q_{00}=p(I_W\cap I_{00})/p(I_R\cap I_{00})$ is a natural measure of how unsuccessful the network is every time C00 is receiving a "1" signal from its associated input logic gate. The values of this measure can vary between 0 and infinity. $Q_{00}$ may be transformed so that bounded values are obtained by using the strongly monotonic decreasing function of $Q_{00}$ $$S_{00}=\frac{1+Q}{1+Q_{00}}-1=\frac{Q-Q_{00}}{1+Q_{00}}=\frac{Qp(I_R\cap I_{00})-p(I_w\cap I_{00})}{p(I_{00})}.$$

If the network is always successful when the element 412 has input 0,0, then $Q_{00}=0$ and $S_{00}$ is equal to the positive value $Q$. If the success of the element 412 under input 0,0 is such that $Q_{00}=Q$, then $S_{00}=0$, and if it is completely unsuccessful, then $Q_{00}=\infty$ and $S_{00}=-1$. Thus $S_{00}$ may be interpreted as a measure of the success of the network every time the input pair 0,0 is applied to the element 412. If $S_{00}$ is multiplied by the relative expected frequency $p(I_{00})$ of input 0,0 to the element 412 then the result is a reasonable measure of how much B00 contributes to the success of the network. But this multiplication gives $Qp(I_R\cap I_{00})-p(I_W\cap I_{00})$ which is precisely the expected rate of upward counting of C00 under the present training strategy.

The application of the above-described first training strategy to networks of elements of the type specified herein tends to systematically single out for change those bistable units therein that at any stage of learning contribute least to the success of the network. This is a significant characteristic of the described training procedure and serves to distinguish that procedure from known training approaches which seek to achieve a desired input-output relationship in an adaptive array by trial and error methods.

As indicated, the first-described training procedure involves the necessity of repeatedly evaluating the performance of the network in order to successively choose new values for Q. By contrast, the second unique training procedure that embodies the principles of this invention does not require seeking a sequence of Q values. The second procedure is therefore, as a practical matter, easier to carry out, but it has been found to be somewhat slower than the approach embodied in the first strategy.

During the first step of the second training procedure illustrative of the principles of the present invention, the training device 120 (FIG. 1) makes a choice (before the first input pattern is presented to the FIG. 4 network) as to whether a right or wrong response of the network will be sought. This choice is made randomly by selecting right or wrong, each with probability one-half. Then, randomly selected 3-digit input patterns are successively applied to the network to be trained. During this application of input patterns to the network, each of the training leads 408 and 410 has a "0" signal applied thereto until a pattern is presented which gives the type of response being sought. At that point, if a right response was sought and occurred, an up-counting pair of training signals is applied to the leads 408 and 410; whereas if a wrong response was sought and occurred, a down-counting pair of training signals is applied thereto. In response to these training signals, appropriate changes of the type described above may take place in the states of the counting units and bistable units included in the elements of FIG. 4. Then, before the next input pattern is applied to the network, the training device 120 again makes a random choice of right or wrong. As before, the next training step (that is, the application of up-counting or down-counting signals to the training leads) will not take place until the chosen type of response occurs in reaction to a subsequently applied input pattern.

In accordance with the above-described second procedure, an up-counting pair of training signals can be expected to be applied to the network to be trained equally as frequently as a down-counting pair. It is noted that this is also the case for the first training procedure if $Q=p(I_W)/p(I_R)$ holds exactly for the segment of the training sequence considered.

A variation of the second training procedure is to choose right with a probability slightly higher (or lower) than one-half, thereby causing a slight tendency toward fixity (or, respectively, change) of the bistable units included in the elements of the network.

The essential difference between the first and second above-described training procedures is that in the second one not all incorrect responses of the network lead to training, but only a fraction of them do. It has been determined that this fraction is equal to $p(I_R)$. This implies a slower rate of learning for the second procedure, particularly at the beginning of the learning process.

Hence, the training device 120 might advantageously employ the first training procedure until $p(I_R)$ became sufficiently large, say, 0.8, and then change to the second procedure which is now only slightly slower and realizes a theoretically more desirable training algorithm, since it allows instantaneous and accurate control over the tendencies of up- and down-counting.

Thus, there have been described in detail herein illustrative elements and networks made in accordance with the principles of the present invention. In addition, there have been described two specific unique procedures according to which a network embodying the invention may be systematically trained.

It is to be understood that the above-described embodiments are only illustrative of the application of the principles of the present invention. In accordance with these principles, numerous other arrangements and procedures may be devised by those skilled in the art without departing from the spirit and scope thereof. For example, although emphasis herein has been directed to simultaneously applying training signals to every element included in a network, it is noted that it may be advantageous under some circumstances to train less than all of the elements at a time. In addition, although specific 16-state counting units have been described herein, it is noted that the range of values of these units depends on the size of the overall network in which the units are included. A network with a relatively large number of input leads would advantageously include higher-capacity counting units than a network with fewer inputs. Similarly, it is advantageous to include higher-capacity units in a network whose input signals are corrupted by noise.

I claim:

1. An $m$-input single-output trainable element comprising:

means for simultaneously supplying $m$ binary input signals, where $m$ is a positive integer greater than 1, input logic means, including $2^m$ output leads, responsive to said input signals for providing a unique binary signal on a different one of said leads in respective response to each different one of the $2^m$ different possible combinations of said input signals, $2^m$ controller means each including a distinct state-indicative signal output lead and each being connected to a different one of said $2^m$ output leads of said input logic means, each of said controller means being characterized by a plurality of stable states and being enabled by a unique binary signal being applied thereto from said input logic means to receive training signals, at least some of said training signals being adapted to change the state of said controller means, means for applying training signals to said controller means, and output logic means, including a single output lead, responsive to signals appearing on said state-indicative output leads and to signals appearing on the output leads of said input logic means for applying to said single output lead a signal that is a specified function of said $m$ input signals, wherein each of said controller means comprises reversible counter means and means adapted to be enabled by a unique binary signal applied to said controller means from said input logic means for routing training signals to said counter means, wherein each of said controller means further includes a bistable unit, and wherein said routing means includes circuitry responsive to said reversible counter means being in a predetermined condition and to the receipt of training signals of a specified type for applying a resetting signal to said counter means and a complementing signal to said bistable unit.

2. A trainable logical network comprising a plurality of $m$-input single-output trainable elements, each of said elements comprising:

means for simultaneously supplying $m$ binary input signals, where $m$ is a positive integer greater than 1, input logic means, including $2^m$ output leads, responsive to said input signals for providing a unique binary signal on a different one of said leads in respective response to each different one of the $2^m$ different possible combinations of said input signals, $2^m$ controller means each including a distinct state-indicative signal output lead and each being connected to a different one of said $2^m$ output leads of said input logic means, each of said controller means being characterized by a plurality of stable states and being enabled by a unique binary signal being applied thereto from said input logic means to receive training signals, at least some of said training signals being adapted to change the state of said controller means, means for applying training signals to said controller means, and output logic means, including a single output lead, responsive to signals appearing on said state-indicative output leads and to signals appearing on the output leads of said input logic means for applying to said single output lead a signal that is a specified function of said $m$ input signals, wherein each of said controller means comprises reversible counter means and means adapted to be enabled by a unique binary signal applied to said controller means from said input logic means for routing training signals to said counter means, wherein each of said controller means further includes a bistable unit, and wherein said routing means including circuitry responsive to said reversible counter means being in a predetermined condition and to the receipt of training signals of a specified type for applying a resetting signal to said counter means and a complementing signal to said bistable unit, and means interconnecting said plurality of elements in a loop-free configuration to form a multiple-input single-output array.